United States Patent
Knudsen, Sr. et al.

(10) Patent No.: US 6,311,851 B1
(45) Date of Patent: Nov. 6, 2001

(54) DECORATIVE WREATH HANGER

(76) Inventors: Curtis Knudsen, Sr., R.R. 1 Box 18A, Princeton, ME (US) 04668; Robert Foss, R.R. 1 Box 123C, Columbia Falls, ME (US) 04623

( * ) Notice: Subject to any disclaimer, the term of this patent is extended or adjusted under 35 U.S.C. 154(b) by 0 days.

(21) Appl. No.: 09/354,093

(22) Filed: Jul. 15, 1999

(51) Int. Cl.⁷ ........................................ A47F 7/00
(52) U.S. Cl. ........................................ 211/13.1
(58) Field of Search ................................. 211/13.1, 117, 211/118; D8/367

(56) References Cited

U.S. PATENT DOCUMENTS

| | | |
|---|---|---|
| 191,645 | 6/1877 | Breese . |
| D. 360,355 | 7/1995 | Adams . |
| D. 365,015 | 12/1995 | Avinger . |
| D. 374,168 | 10/1996 | Protz, Jr. . |
| 3,199,820 | 8/1965 | Thompson . |
| 3,511,461 | 6/1967 | Clark . |
| 3,536,286 | 10/1970 | Kramer . |
| 4,407,478 | 10/1983 | Hodges . |
| 5,542,631 | 8/1996 | Bruno . |
| 5,553,823 | 9/1996 | Protz, Jr. . |
| 5,607,130 | 3/1997 | Smay et al. . |

*Primary Examiner*—Alvin Chin-Shue
*Assistant Examiner*—Sarah Purol
(74) *Attorney, Agent, or Firm*—Shlesinger, Arkwright & Garvey LLP

(57) ABSTRACT

A combination wreath hanging and decoration supporting assembly for mounting on a support structure comprising a first bracket including a leg having a first end portion and a wreath supporting second end portion opposite the first end portion, a second bracket connectable with the first bracket and including first and second generally coplanar legs and an intermediate portion interconnecting the generally coplanar first and second legs, the intermediate portion including a decoration mounting surface off-set from the generally coplanar first and second legs, a first connecting member connecting the first bracket and the second bracket, and a mounting element connectable with one of the first or second brackets and engagable with the support structure.

20 Claims, 4 Drawing Sheets

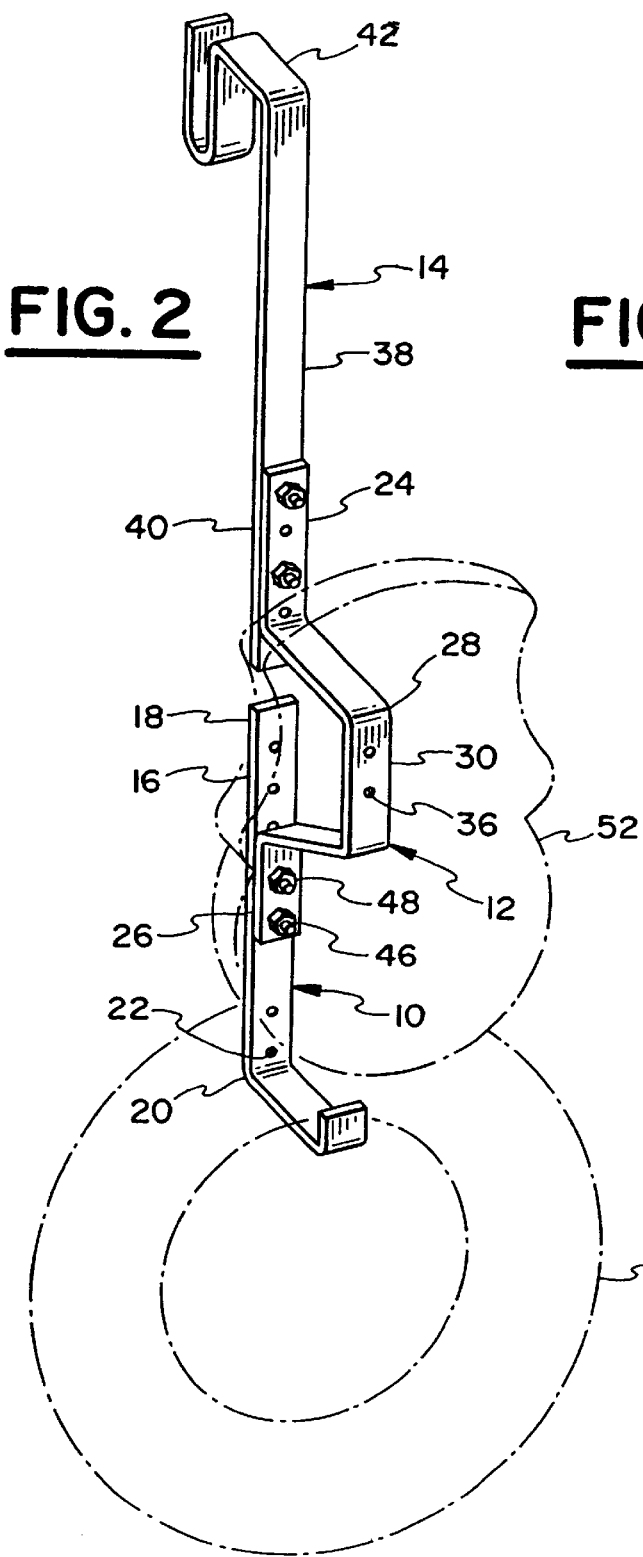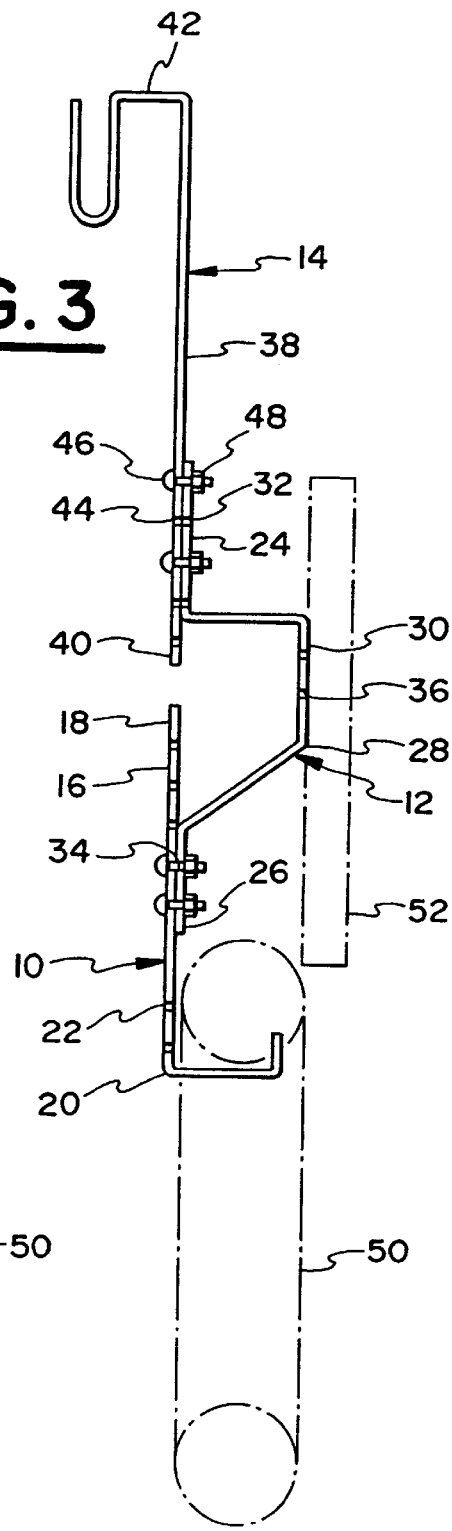

DECORATIVE WREATH HANGER

BACKGROUND OF THE INVENTION

This invention relates to a combination wreath hanging and decoration supporting device. In particular, the wreath hanging and decoration supporting device of the present invention is a multi-part structure which is reconfigurable and adjustable in order to provide enhanced wreath hanging and decoration supporting versatility.

A number of wreath hangers and wreath supporting devices are known in the art. One such device is a freestanding easel. A free-standing easel is space consuming and can not be used for mounting a wreath upon a wall or from a door.

Simple wall fasteners such as nails, screws and hooks have been used in the past for wall mounting of wreaths. Such wall fasteners are generally inadequate in that they do not provide sufficient support for many wreaths.

Sectional wreath hangers are taught by Protz, Jr. in U.S. Pat. Nos. 5,553,823 and D 374,168. These multi-part hangers are used for mounting wreaths from doors; however, they are unsuitable for wall mounting purposes. Furthermore, they do not provide means for mounting decorations other than wreaths.

In view of the limitations of the prior art, a need exists for a versatile, multi-functional wreath and decoration supporting device.

OBJECTS AND SUMMARY OF THE PRESENT INVENTION

It is therefor an object of the invention to provide a multi-functional wreath hanging assembly suitable for supporting a wreath and an independent ancillary decoration.

It is another object of the invention to provide a wreath hanging assembly which is convertible so as to be easily mounted on a variety of supporting structures.

It is another object of the invention to provide a wreath hanging assembly comprising multiple sections which are reconfigurable and adjustable to provide enhanced versatility.

It is a further objection of the invention to provide a wreath hanging assembly which is easy to use and assemble.

Yet a further objection of the invention is to provide a wreath hanging assembly which is inexpensive to manufacture.

According to a first embodiment of the invention, the wreath hanging assembly is comprised of three bracket sections, namely, a wreath hanging bracket, a decoration supporting bracket and an support mounting bracket.

The wreath hanging bracket includes a hook-shaped lower end portion upon which a wreath may be hung. The decoration supporting bracket is attachable to the wreath hanging bracket and includes an off-set surface for mounting a separate ancillary decoration. The support mounting bracket may be interchangeably connected to either the wreath hanging bracket or the decoration supporting bracket. The support mounting bracket includes a hook-shaped upper end portion for mounting upon a door, a horizontal rail, a tombstone or the-like.

BRIEF DESCRIPTION OF THE DRAWINGS

The above and other objects and advantages of this invention and the manner of obtaining them will become readily apparent by reference to the following description of the invention taken in conjunction with the accompanying drawings, wherein:

FIG. 2 is a perspective view of the assembly of FIG. 1B with a wreath and an ancillary decoration shown in phantom lines.

FIG. 3 is a side-elevational view of FIG. 2.

Corresponding references numbers are used to indicate corresponding parts in the various embodiments described herein.

DETAILED DESCRIPTION OF THE PREFERRED EMBODIMENTS

Figures 1A, 1B:
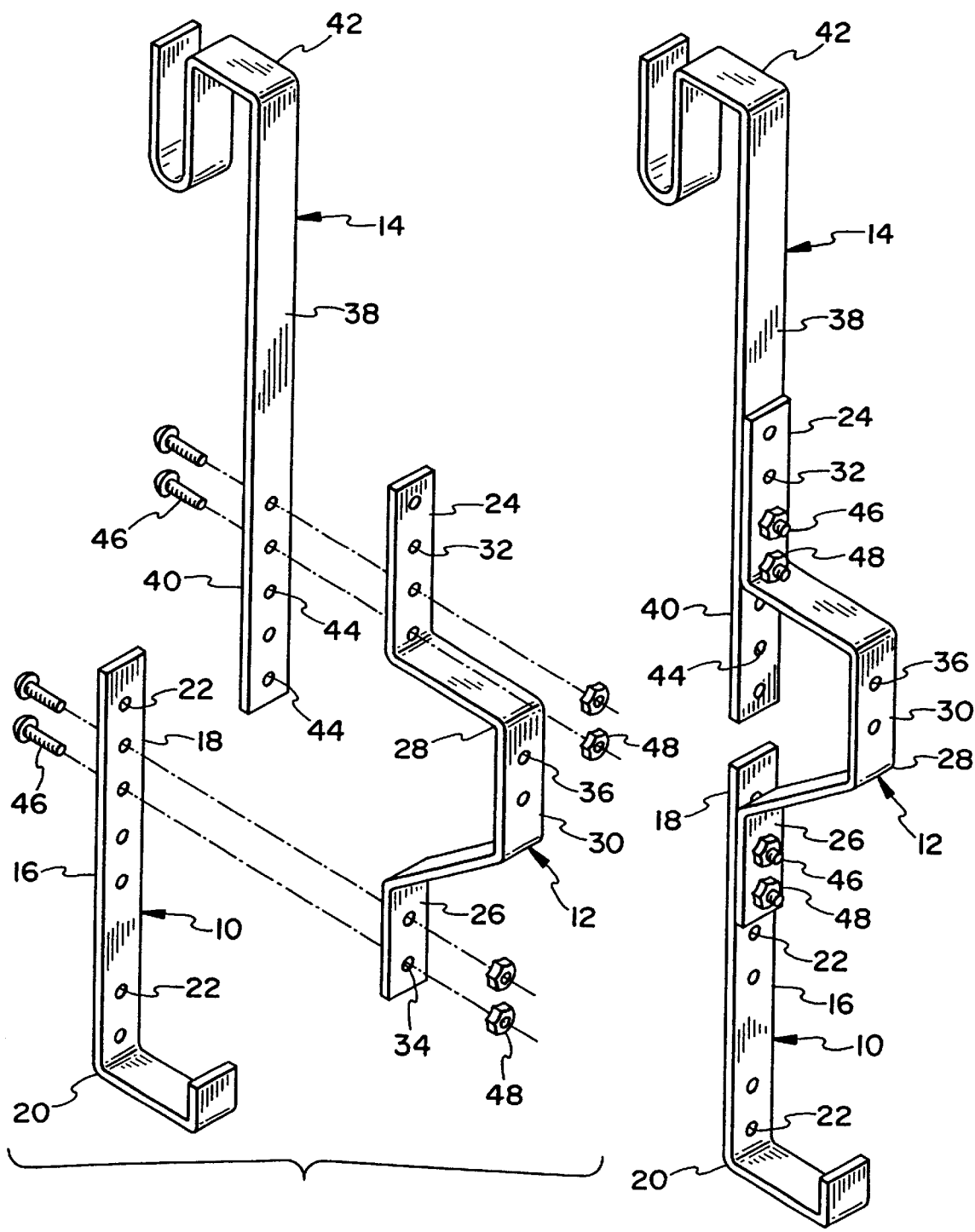
FIG. 1A is an exploded perspective view of the wreath hanging and decoration supporting assembly according to a first embodiment.
FIG. 1B is a perspective view of the wreath hanging and decoration supporting assembly of FIG. 1A shown in an assembled state.

According to a first embodiment as depicted in FIGS. 1A and 1B, the wreath hanging and decoration supporting assembly is comprised of a wreath hanging bracket 10, a decoration supporting or "kick-out" bracket 12 and a support mounting bracket 14, Wreath hanging bracket 10 includes a leg 16 having an upper end portion 18 and a hook-shaped lower end portion 20. A plurality of spaced-apart adjustment holes 22 are formed in leg 16 of wreath hanging bracket 10.

Decoration supporting or "kick-out" bracket 12 includes an upper leg 24, a lower leg 26 generally coplanar with upper leg 24, and an intermediate portion 28 interconnecting generally coplanar legs 24 and 26. Intermediate portion 28 includes a decoration mounting surface 30 which is off-set relative to generally coplanar legs 24 and 26. Decoration mounting surface 30 extends generally parallel to legs 24 and 26. Spaced-apart adjustment holes 32 are formed in upper leg 24. Likewise, spaced-apart adjustment holes 34 are formed in lower leg 26. Decoration mounting surface 30 is provided with decoration mounting holes 36.

Mounting bracket 14 includes a leg 38 having a lower end portion 40 and a hook-shaped upper end portion 42. Leg 38 is provided with spaced-apart adjustment holes 44.

Bolts 46 and nuts 48 are provided for interconnecting brackets 10, 12 and 14.

Bracket 12 is connected with bracket 10 by superimposing legs 26 and 16 so that one or more holes 34 in leg 26 are aligned with one or more holes 22 in leg 16. One or more bolts 46 are then passed through the aligned holes and retained in place by nuts 48.

In a similar fashion, bracket 12 is connected with bracket 14 by superimposing legs 24 and 38 so that one or more holes 32 in leg 24 are aligned with one or more holes 44 in leg 38. One or more bolts 46 are then passed through the aligned holes and retained in place by nuts 48.

While specific hole alignments are depicted in FIGS. 1A and 1B, it should be noted that other hole alignments may be chosen in order to provide adjustability between the three bracket sections 10, 12 and 14, as will be discussed in greater detail hereinafter.

As shown in FIGS. 2 and 3, a wreath 50 (depicted in phantom lines) is suspended from hook-shaped lower end portion 20 of bracket 10, while an ancillary decoration 52 (depicted in phantom lines) is independently mounted by suitable fastening means (not shown) upon off-set mounting surface 30 of bracket 12, thereby creating a two-piece display. By mounting decoration 52 upon the off-set mounting surface 30, decoration 52 is positioned substantially flush with the face of wreath 50. Such a mounting arrangement allows an illusion to be created whereby decoration 52 appears to be an extension of wreath 50.

The wreath hanging and decoration supporting assembly of FIGS. 1 through 3 is self-hanging in that no auxiliary hardware is required for its mounting on a support structure (not shown). The assembly may be hung directly upon a support structure such as a door, a railing, a tombstone or the like by means of the hook-shaped end portion 42 of mounting bracket 14.

Through the selective choice of hole alignments in the superimposed legs of the respective brackets, various adjustments are made possible. These adjustments allow the assembly to accommodate wreaths and ancillary decorations of various sizes. These adjustments further allow alterations as to the positions of the display elements, i.e. wreath 50 and ancillary decoration 52, relative to each other and relative to the support structure (not shown).

While the overall configuration of the wreath hanging and decoration supporting assembly shown in FIGS. 2 and 3 is the same as that as shown in FIGS. 1A and 1B, the hole alignments and bolt locations have been altered to show positional changes between the individual bracket sections.

Figure 4:
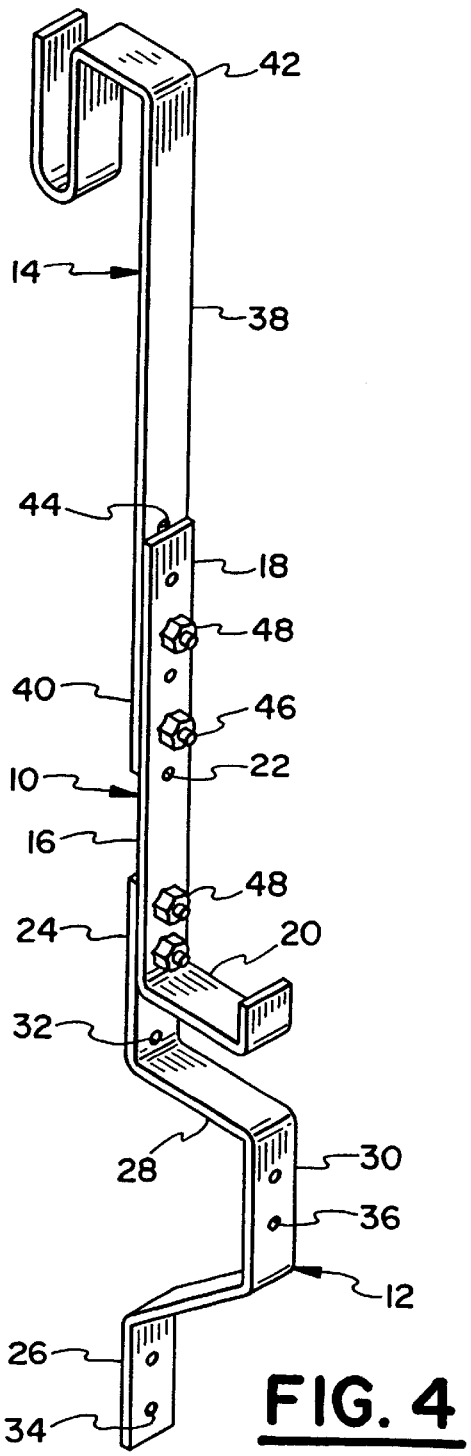
FIG. 4 is a perspective view of the wreath hanging and decoration supporting assembly according to a second embodiment.
Figure 5:
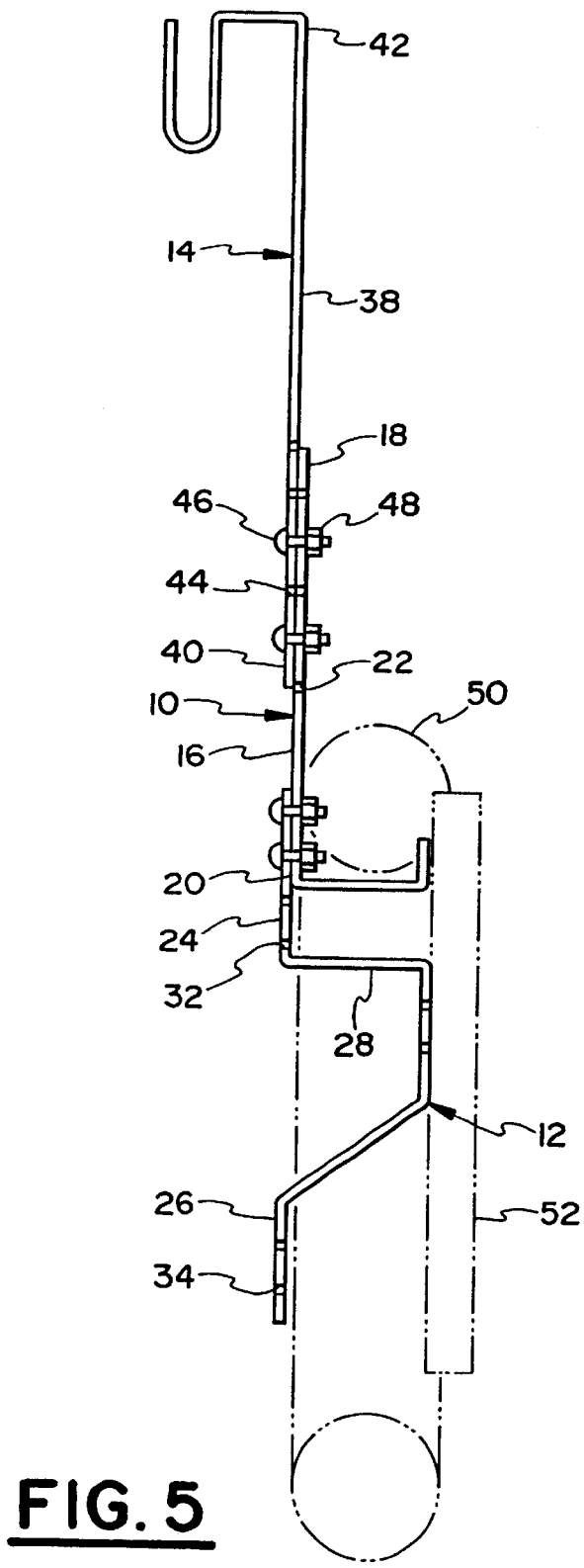
FIG. 5 is a side-elevational view of FIG. 4 with a wreath and an ancillary decoration shown in phantom lines.

A second embodiment of a reconfigured wreath hanging and decoration supporting assembly is shown in FIGS. 4 and 5.

In this embodiment, mounting bracket 14 is connected to wreath hanging bracket 10, which in turn is connected to decoration supporting bracket 12. By rearranging the bracket sections in this manner, a new display configuration may be achieved.

As shown in FIG. 5, a wreath 50 (shown in phantom line) is suspended by hook-shaped end portion 20 of wreath hanging bracket 10, while an ancillary decoration 52 (shown in phantom lines) is mounted by suitable fastening means (not shown) upon off-set mounting surface 30 of decoration supporting bracket 12. Ancillary decoration 52 is thus positioned within the central region of wreath 50. The off-set nature of mounting surface 30 allows the ancillary decoration 52 to lie substantially flush with the surface of wreath 50, thereby providing the desired visual effect as previously noted.

The assembly of FIGS. 4 and 5 is self-hanging in that it may be hung directly from a suitable support structure (not shown) by means of the hook-shaped end portion 42 of mounting bracket 14 without the use of auxiliary mounting hardware.

Bracket adjustments are possible through judicious selection of hole alignments in the superimposed legs 16 and 24 and/or in the superimposed legs 16 and 38.

Figure 6:
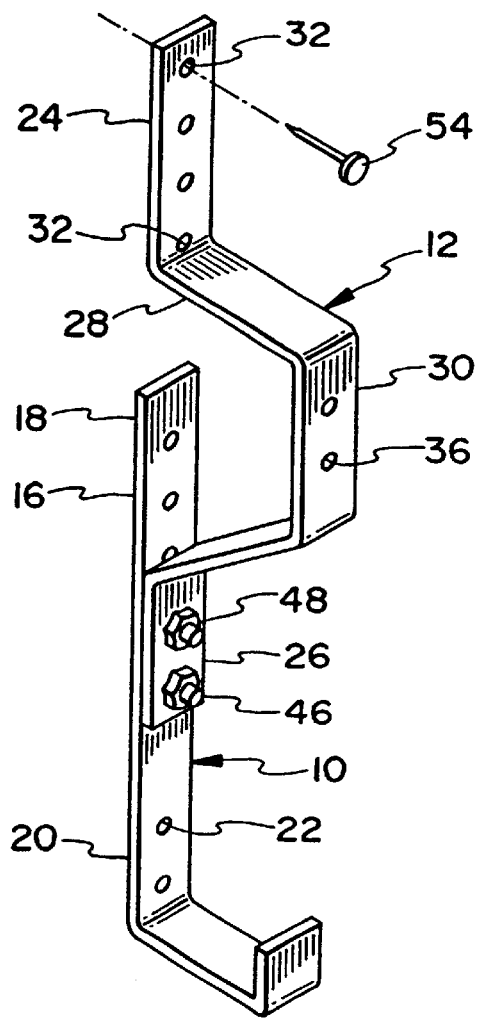
FIG. 6 is an exploded perspective view of the wreath hanging and decoration supporting assembly according to a third embodiment.

According to a third embodiment of the invention as shown in FIG. 6, the wreath hanging assembly is comprised of two brackets, namely, hanging bracket 10 and decoration supporting bracket 12. In this embodiment, leg 16 of wreath hanging bracket 10 is adjustably connected to lower leg 26 of decoration supporting bracket 12.

A wreath (not shown) and an ancillary decoration (not shown) may be mounted upon the assembly of FIG. 6 in the same manner as previously described in conjunction with the embodiment of FIGS. 2 and 3.

The assembly of FIG. 6 is suitable for wall-mounting through the provision of a separate wall fastener such as a nail 54. Other suitable wall fasteners could be used in place of nail 54 such as a screw, a wall-anchorable hook or the like.

The nail or other substitute wall fastener is received in a suitable adjustment hole 32 provided in bracket leg 24.

Figure 7:
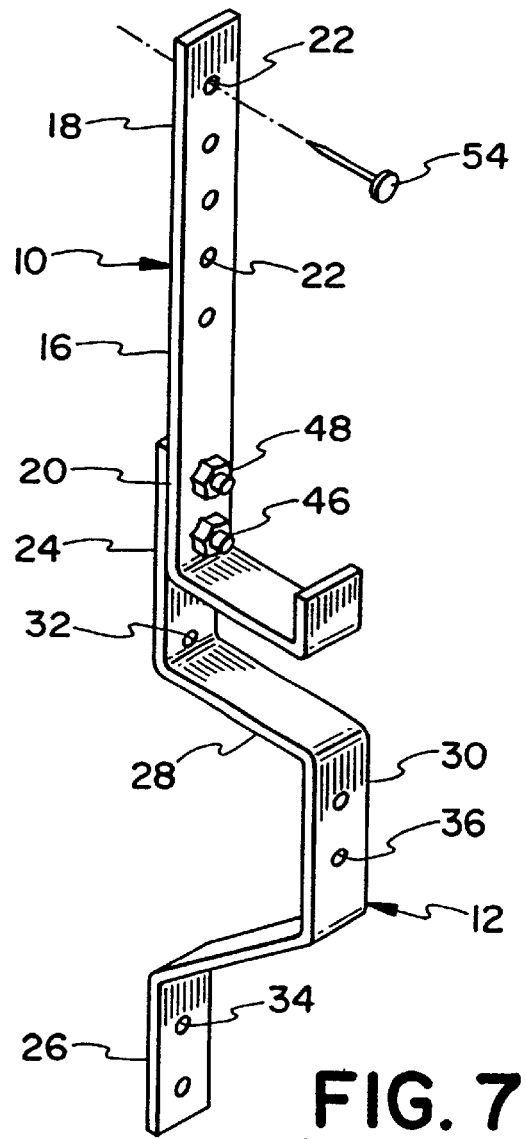
FIG. 7 is an exploded perspective view of the wreath hanging and decoration supporting assembly according to a fourth embodiment.

A fourth embodiment of the invention is shown in FIG. 7. This assembly is likewise comprised of a wreath hanging bracket 10 and a decoration supporting bracket 12, however, in this instance leg 16 of wreath hanging bracket 10 is adjustably connected to upper leg 24 of decoration supporting bracket 12. A wreath (not shown) and an ancillary decoration (not shown) may be mounted in the same manner as previously described in conjunction with the embodiment of FIGS. 4 and 5.

The assembly of FIG. 7 may be mounted upon a wall (not shown) by a nail 54 or by an analogous wall fastening device such as a screw, a wall-anchorable hook or the like. The nail or substitute wall fastener is received in a suitable adjustment hole 22 provided in bracket leg 16.

Bracket 10 may be adjusted relative to bracket 12 by rearranging the hole alignments in superimposed legs 16 and 24.

It is contemplated that each of the previously described bracket sections 10, 12 and 14 may be made from any suitable material known in the art. These materials include various plastics, metals, wood, composites and the like.

While this invention has been described in connection with different embodiments thereof, it will be understood that is capable of further modifications, and this application is intended to cover any variations, uses or adaptations of the invention following, in general, the principals of the invention and including such departures from the present disclosure as come within known or customary practice in the art to which the invention pertains as may be applied to the essential features hereinbefore set forth and followed in the scope of the invention or the limits of the appended claims.

We claim:

1. A combination wreath hanging and decoration supporting assembly for mounting on a support structure comprising:
   a) a first bracket;
   b) said first bracket including a leg having a first end portion and a wreath supporting second end portion opposite said first end portion, said leg having a substantially planar configuration;
   c) a second bracket connectable with said first bracket;
   d) said second bracket including a first leg, a second leg generally coplanar with said first leg, and an intermediate portion interconnecting said first leg and said second leg;
   e) said intermediate portion including a decoration mounting surface off-set from said generally coplanar first and second legs, said wreath supporting second end portion of said first bracket including an arm member, said arm member extending from said first bracket leg to about said decoration mounting surface;

f) a first connecting member, said first connecting member connecting said first and said second brackets so that said second bracket first leg, said second bracket second leg and said first bracket leg are coplanar to each other; and, g) a mounting element connectable with one of said first or said second brackets and engagible with a support structure.

2. A combination wreath hanging and decoration supporting assembly as in claim 1, wherein:

a) said arm member has a configuration in the shape of a hook.

3. A combination wreath hanging and decoration supporting assembly as in claim 1, wherein:

b) said mounting element including a wall fastener.

4. A combination wreath hanging and decoration supporting assembly as in claim 3, wherein:

a) said wall fastener is a nail.

5. A combination wreath hanging and decoration supporting assembly as in claim 1, wherein:

a) said mounting element is a third bracket; and b) said third bracket including a leg having a first end portion and a second end portion said second end portion of said third bracket is adapted to engage a support structure.

6. A combination wreath hanging and decoration supporting assembly as in claim 5, wherein:

a) said second end portion of said third bracket is a hook.

7. A combination wreath hanging and decoration supporting assembly as in claim 1, wherein:

a) said leg of said first bracket including spaced-apart adjustment holes;

b) each of said first and said second legs of said second bracket including spaced-apart adjustment holes; and, c) at least one of said holes in said leg of said first bracket being alignable with at least one of said holes in one of said legs of said second bracket.

8. A combination wreath hanging and decoration supporting assembly as in claim 7, wherein:

a) said first connecting member is a bolt positionable in said alignable holes in said first and said second brackets.

9. A combination wreath hanging and decoration supporting assembly as in claim 7, wherein:

a) said mounting element is a third bracket, b) said third bracket including a leg having a first end portion and a support structure engagable second end portion; and, c) said leg of said third bracket including spaced-apart adjustment holes.

10. A combination wreath hanging and decoration supporting assembly as in claim 9, wherein:

a) at least one of said holes in said leg of said third bracket is alignable with at least one of said holes in the other of said legs of said second bracket.

11. A wreath hanging and decoration supporting assembly as in claim 10, further including:

a) a second connecting member adapted to connect said second bracket and said third bracket.

12. A combination wreath hanging and decoration supporting assembly as in claim 11, wherein:

a) said second connecting member is a bolt positionable in said alignable holes in said second and said third brackets.

13. A combination wreath hanging and decoration supporting assembly as in claim 9, wherein:

a) at least one of said holes in said leg of said third bracket being alignable with at least one of said holes in said leg of said first bracket.

14. A combination wreath hanging and decoration supporting assembly as in claim 13, including:

a) a second connecting member connecting said first bracket and said third bracket.

15. A combination wreath hanging and decoration supporting assembly as in claim 14, wherein:

a) said second connecting member is a bolt positionable in said alignable holes in said first and said third brackets.

16. A convertible wreath hanging and decoration supporting assembly comprising:

a) a wreath hanging bracket, said wreath hanging bracket including a leg having an upper end portion and a wreath hanging lower end portion and having a substantially planar configuration, said lower end portion of said wreath hanging bracket leg including an arm member extending substantially perpendicular therefrom and configured to receive and support a wreath in an underlying manner;

b) a decoration supporting bracket selectively connectable with said wreath hanging bracket, said decoration supporting bracket including generally coplanar upper and lower legs and an intermediate portion interconnecting said generally coplanar upper and lower legs;

c) said intermediate portion including a decoration mounting surface off-set from said generally coplanar upper and lower legs, said arm member extending from said lower end portion of said wreath hanging bracket leg to about said off-set decoration mounting surface; and, d) a first connector, said first connector adapted for selectively connecting said wreath hanging bracket leg with one of said decoration supporting bracket generally coplanar upper and lower legs whereby each of said decoration supporting bracket upper leg, said decoration supporting bracket lower leg and said wreath hanging bracket leg are aligned and fixed in a coplanar manner.

17. A convertible wreath hanging and decoration supporting assembly as in claim 16, wherein:

a) said first connector connecting said wreath hanging bracket leg with said lower leg of said decoration supporting bracket.

18. A convertible wreath hanging and decoration supporting assembly as in claim 17, and further including:

a) a mounting bracket; and, b) a second connector, said second connector connecting said mounting bracket with said upper leg of said decoration supporting bracket.

19. A convertible wreath hanging and decoration supporting assembly as in claim 16, wherein:

a) said first connector connecting said upper leg of said decoration supporting bracket with said lower end portion of said wreath hanging bracket leg.

20. A convertible wreath hanging and decoration supporting assembly as in claim 19, and further including:

a) a mounting bracket; and, b) a second connector connecting said mounting bracket with said upper end portion of said wreath hanging bracket leg.

* * * * *